No. 886,337. PATENTED MAY 5, 1908.
L. R. BALKEN.
BAIT HOLDER.
APPLICATION FILED JULY 20, 1907.
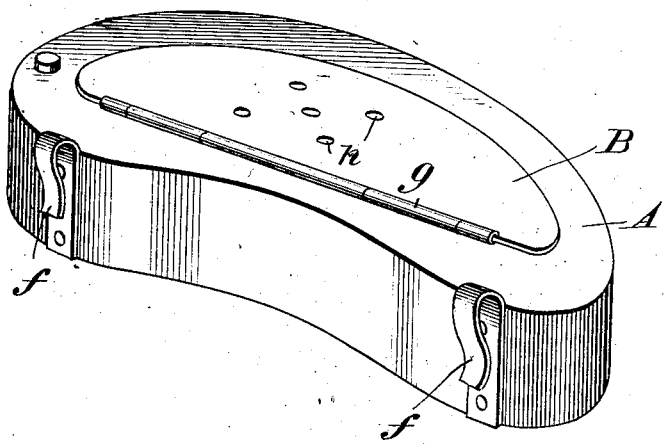
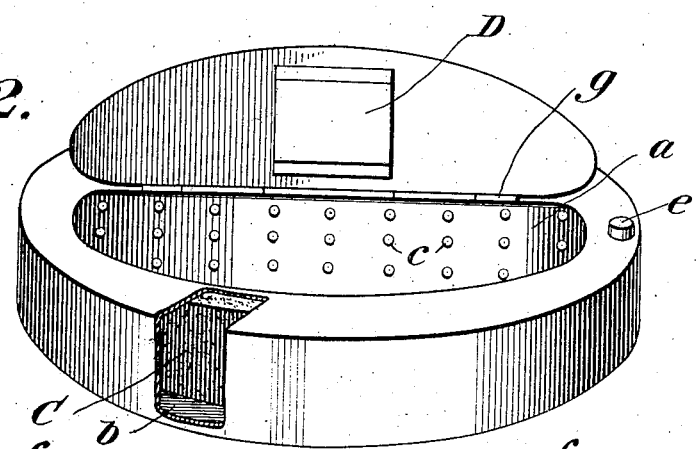
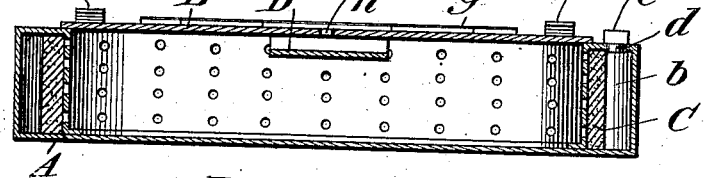
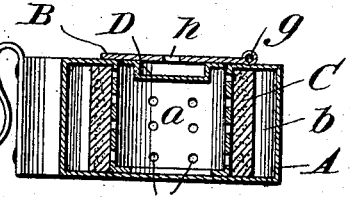
Inventor
L. R. Balken
Witnesses
Phil E. Barnes
Frank Sheehy
By James J. Sheehy
Attorney

UNITED STATES PATENT OFFICE.

LUDWIG R. BALKEN, OF ALPENA, MICHIGAN.

BAIT-HOLDER.

No. 886,337.  Specification of Letters Patent.  Patented May 5, 1908.

Application filed July 20, 1907. Serial No. 384,694.

*To all whom it may concern:*

Be it known that I, LUDWIG R. BALKEN, citizen of the United States, residing at Alpena, in the county of Alpena and State of Michigan, have invented new and useful Improvements in Bait-Holders, of which the following is a specification.

My invention pertains to bait holders; and it contemplates the provision of a bait holder designed more particularly for carrying what are commonly known as "angle" worms, and constructed with a view of preserving the worms in moist, fresh and lively condition for an indefinite period.

With the foregoing in mind the invention will be fully understood from the following description and claim when the same are read in connection with the drawings accompanying and forming part of this specification, in which:

Figure 1 is a perspective view of the bait holder constituting the preferred embodiment of my invention as the same appears when its cover is closed. Fig. 2 is a perspective view showing the holder with its cover open and also showing the outer wall of the holder body partly broken away. Fig. 3 is a longitudinal central section of the holder with the cover closed. Fig. 4 is a transverse section taken through the holder body and cover.

Similar letters of reference designate corresponding parts in all of the views of the drawings.

My novel bait holder is preferably, though not necessarily, made of tin or analogous material; and it is made up of a body A and a cover B. The body A is curved in the direction of its length as best shown in Fig. 1 to conform to the waist of a fisherman, and is provided with a central compartment $a$ to receive earth and "angle" worms, and is also provided with a jacket $b$ which extends entirely around the compartment $a$ and is provided in its inner wall with a plurality of apertures $c$. In its top wall, preferably adjacent to one end of the body A, the jacket $b$ is provided with a filling aperture $d$, normally closed by a removable, threaded cap $e$ or any other closure device suitable to the purpose. The jacket $b$ is designed to be supplied with water through the aperture $d$, and in order to retain the water and give the same off slowly to the earth in the compartment $a$, I provide the said jacket $b$ with a lining C, of felt or other absorbent material suitable to the purpose, which is arranged against the inner foraminated wall of the jacket as best shown in Figs. 2 and 4. As best shown in Fig. 1, the body A is further provided at its back with two hooks $f$, preferably of resilient material, through which the holder may be readily attached to and securely supported on the belt of a fisherman or to any convenient part of the fisherman's apparel. The cover B is designed to rest over and close the compartment $a$ of the body A, and is hinged at $g$ to the said body. In the said cover, preferably at the center thereof, are formed apertures $h$ for the admission of air, and in order to prevent the sun striking through the said apertures and drying up the earth in the compartment $a$, I provide the shield D shown in Figs. 2 and 3. The end portions of the said shield D are soldered or otherwise connected to the under side of the cover B, but the major portion of the shield is disposed a slight distance below the said under side of the cover. From this it follows that while the shield will preclude the sun drying up the earth in the compartment $a$, it will not interfere with the free circulation of air through the apertures $h$ and to and from the compartment $a$.

In the practical use of my novel holder, the "angle" worms are placed together with a quantity of earth in the compartment $a$ of the body A, and the requisite amount of water is supplied to the jacket $b$ through the filling aperture $d$. With this done the closure device $e$ is placed in position and the cover B is closed. It will be appreciated from the foregoing that the water supplied to the jacket $b$ will be taken up by the absorbent lining C, and consequently the said lining will give off moisture slowly, and such moisture passing through the apertures $c$ in the inner wall of the jacket will maintain the earth in the compartment $a$ in a damp, soft and cool state. Because of this the "angle" worms in the earth will obviously be kept fresh and lively for an indefinite period so that they may be used to the best advantage as bait.

Notwithstanding the practical advantages of my novel bait holder as pointed out in the foregoing, it will be noticed that the holder is very simple and inexpensive in construction, is compact and light in weight as is desirable, and is well adapted to withstand the usage to which fishermen's appliances are ordinarily subjected.

The construction herein shown and described constitutes the preferred embodiment of my invention, but it is obvious that in practice such changes or modifications may be made as fairly fall within the scope of my invention as defined in the claims appended.

Having described my invention, what I claim and desire to secure by Letters-Patent is:

A bait holder comprising a body having a foraminated wall dividing the body into a central compartment open at its top and a jacket surrounding the compartment and also having a filling aperture in communication with the jacket and removable means for closing said aperture, absorbent material arranged in the jacket and surrounding the said foraminated wall, a cover carried by the body and arranged in one position to rest over and close the said compartment and having ventilating apertures, and a sheave attached at its ends to the under side of the cover and having a portion disposed a slight distance below the said ventilating aperture to permit the passage of air therethrough and protect the contents of the compartment against the sun.

In testimony whereof I have hereunto set my hand in presence of two subscribing witnesses.

LUDWIG R. BALKEN.

Witnesses:
H. M. BUCHANAN,
J. H. JUDSON.